US010187495B2

United States Patent
Galkin et al.

(10) Patent No.: US 10,187,495 B2
(45) Date of Patent: Jan. 22, 2019

(54) IDENTIFYING PROBLEMATIC MESSAGES

(71) Applicant: HEWLETT PACKARD ENTERPRISE DEVELOPMENT LP, Houston, TX (US)

(72) Inventors: Ola Galkin, Yehud (IL); Sigal Mendel, Yehud (IL); Gil Kedem, Yehud (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 168 days.

(21) Appl. No.: 15/275,070

(22) Filed: Sep. 23, 2016

(65) Prior Publication Data

US 2018/0091404 A1   Mar. 29, 2018

(51) Int. Cl.
*H04L 12/26* (2006.01)
*H04L 29/06* (2006.01)
*H04L 29/08* (2006.01)
*H04L 12/24* (2006.01)

(52) U.S. Cl.
CPC ............ *H04L 67/42* (2013.01); *H04L 41/069* (2013.01); *H04L 43/062* (2013.01); *H04L 67/02* (2013.01); *H04L 43/0852* (2013.01)

(58) Field of Classification Search
CPC ... H04L 43/0847; H04L 43/062; H04L 67/42; H04L 67/02
USPC ....................................................... 709/224
See application file for complete search history.

(56) References Cited

U.S. PATENT DOCUMENTS

| 7,089,250 B2* | 8/2006 | Doganata | G06F 11/0709 |
| 7,788,360 B2* | 8/2010 | Welch, Jr. | G06Q 10/10 709/223 |
| 7,788,370 B2* | 8/2010 | Yugami | G06F 11/3447 709/223 |
| 8,209,567 B2* | 6/2012 | Cohen | G06F 11/3476 714/26 |
| 2003/0208544 A1* | 11/2003 | Wilson | H04L 12/2856 709/206 |
| 2004/0116140 A1* | 6/2004 | Babbar | H04W 88/02 455/517 |
| 2005/0026130 A1* | 2/2005 | Crowhurst | G09B 7/02 434/362 |
| 2005/0120242 A1* | 6/2005 | Mayer | G06F 21/55 726/4 |
| 2005/0203673 A1* | 9/2005 | El-Hajj | G06Q 10/08 701/1 |
| 2007/0025287 A1* | 2/2007 | Goren | H04W 16/18 370/328 |

(Continued)

OTHER PUBLICATIONS

Aharon, M. et al., "One Graph is Worth a Thousand Logs: Uncovering Hidden Structures in Massive System Event Logs," (Research Paper), Joint European Conference on Machine Learning and Knowledge Discovery in Databases, Springer Berlin Heidelberg, 2009, pp. 227-243.

*Primary Examiner* — David R Lazaro
*Assistant Examiner* — Berhanu Shitayewoldetadik (57) ABSTRACT

Examples relate to identifying problematic messages. In one example, a computing device may: obtain, for each of a plurality of server requests, at least one log message; obtain, for each of the server requests, a measure of server request success; for each of the obtained log messages, cluster the obtained log message into one of a plurality of log clusters, the clustering being based on a measure of similarity between the obtained log message and other log messages included in the log cluster; and for each of the obtained log messages, increment a particular counter associated with the log cluster into which the obtained log message is clustered, the particular counter being selected for incrementing based on the measure of server request success.

20 Claims, 4 Drawing Sheets

(56) References Cited

U.S. PATENT DOCUMENTS

| | | | |
|---|---|---|---|
| 2007/0294765 A1* | 12/2007 | Rihn | G06F 21/56 726/22 |
| 2008/0134209 A1* | 6/2008 | Bansal | G06F 11/3612 719/317 |
| 2008/0177994 A1* | 7/2008 | Mayer | G06F 9/4418 713/2 |
| 2008/0201779 A1* | 8/2008 | Tahan | G06F 21/00 726/23 |
| 2008/0247390 A1* | 10/2008 | Shenfield | H04L 67/14 370/389 |
| 2010/0070625 A1* | 3/2010 | Flowerday | H04L 43/024 709/224 |
| 2010/0174388 A1* | 7/2010 | Ferreira | G05B 23/0267 700/83 |
| 2011/0185234 A1* | 7/2011 | Cohen | G06F 11/3476 714/37 |
| 2012/0072782 A1* | 3/2012 | Hughes | H04L 12/6418 714/57 |
| 2012/0124047 A1* | 5/2012 | Hubbard | G06F 17/30637 707/737 |
| 2013/0054680 A1* | 2/2013 | Nakano | G06F 11/3495 709/203 |
| 2014/0156761 A1* | 6/2014 | Heffernan | H04L 51/32 709/206 |
| 2014/0280197 A1* | 9/2014 | Gatto | G06F 17/30424 707/741 |
| 2015/0363214 A1* | 12/2015 | Du | G06F 17/30705 703/23 |
| 2016/0124823 A1* | 5/2016 | Ruan | G06F 11/2257 714/26 |

* cited by examiner

IDENTIFYING PROBLEMATIC MESSAGES

BACKGROUND

In the computing context, many different types of messages are produced by various devices and for various purposes. Computing applications, security devices, and web servers may all produce messages during their operation. When a problem occurs, diagnosing the problem often involves going through logs of messages associated with a problem to determine what caused the problem to occur.

BRIEF DESCRIPTION OF THE DRAWINGS

The following detailed description references the drawings, wherein.

DETAILED DESCRIPTION

In the computing context, messages may be produced by various devices, and a message analyzing device may use those messages to determine which messages may be indicative of a problem. For example, messages produced by a device may be collected over time and clustered into clusters of similar log messages, e.g., based on syntactical and/or grammatical similarity. When messages are clustered, counters for each cluster may track how many of the messages added to the cluster were associated with a problem, and how many of the messages were benign. In a situation where a problem occurs on the device, the messages produced by the device when the problem occurred may be clustered, and problematic messages may be identified using the counters of the clusters.

By way of example, a web server or group of web servers may handle many server requests during its operation. Each server request, whether successful or not, may be associated with log messages produced by the server device, e.g., HTTP status codes, database messages, and/or client request messages. The messages are clustered together based on similarity. For example, many messages are generated using a template, and one way to cluster messages is by clustering together messages that were created using the same template. Messages may be clustered in other ways as well, e.g., based on matching error codes, device identifiers, specific key words, and/or syntactical similarities.

Each time a log message is identified as belonging to a cluster, a counter for the cluster may be updated. For example, each cluster may have two counters: a problematic log message counter and a benign log message counter. In situations where a log message added to the cluster is associated with a problematic server request, the problematic log message counter may be incremented. In situations where a log message added to the cluster is associated with a benign server request, the benign log message counter may be incremented. A determination regarding whether log messages are associated with a problematic or benign server request may be performed in a variety of ways. Some server requests may fail, indicating a problematic server request, but in some implementations even successful requests may be associated with a problem, e.g., in situations where a response time exceeds a predetermined threshold. Other factors may also be used to determine whether a server request is problematic or benign.

The counters may be used to identify log messages that may be indicative of a problem and log messages that are more likely to be benign. For example, in a situation where a problematic server request is identified, 50 different log messages may be produced by the server device associated with the problematic server request. For each of those log messages, a cluster may be identified, and the counters associated with the clusters may provide an indication of whether or not the log message that belongs to that cluster is indicative of a problem. For example, a particular cluster may have a problematic counter of 800 and a benign counter of 200, indicating that log messages that belong to that particular cluster are associated with a problematic server request 80% of the time. In this situation, a log message that is identified as belonging to the particular cluster may be identified as problematic. The manner in which a cluster is determined to be problematic may vary, e.g., using thresholds. In the example above, identifying two of the different log messages as problematic, and the other 48 as benign, may facilitate focusing problem solving attention on the two problematic log messages.

While the description of the processes for identifying problematic messages may involve "clusters" and "clustering," these terms are meant to include variations on clustering, such as regular expression matching and other ways to group or identify similar messages. For example, a message that is included in or belonging to a particular cluster may also be said to match a regular expression for used to match similar messages. Further details regarding the identification of problematic messages are provided in the paragraphs that follow.

Figure 1:
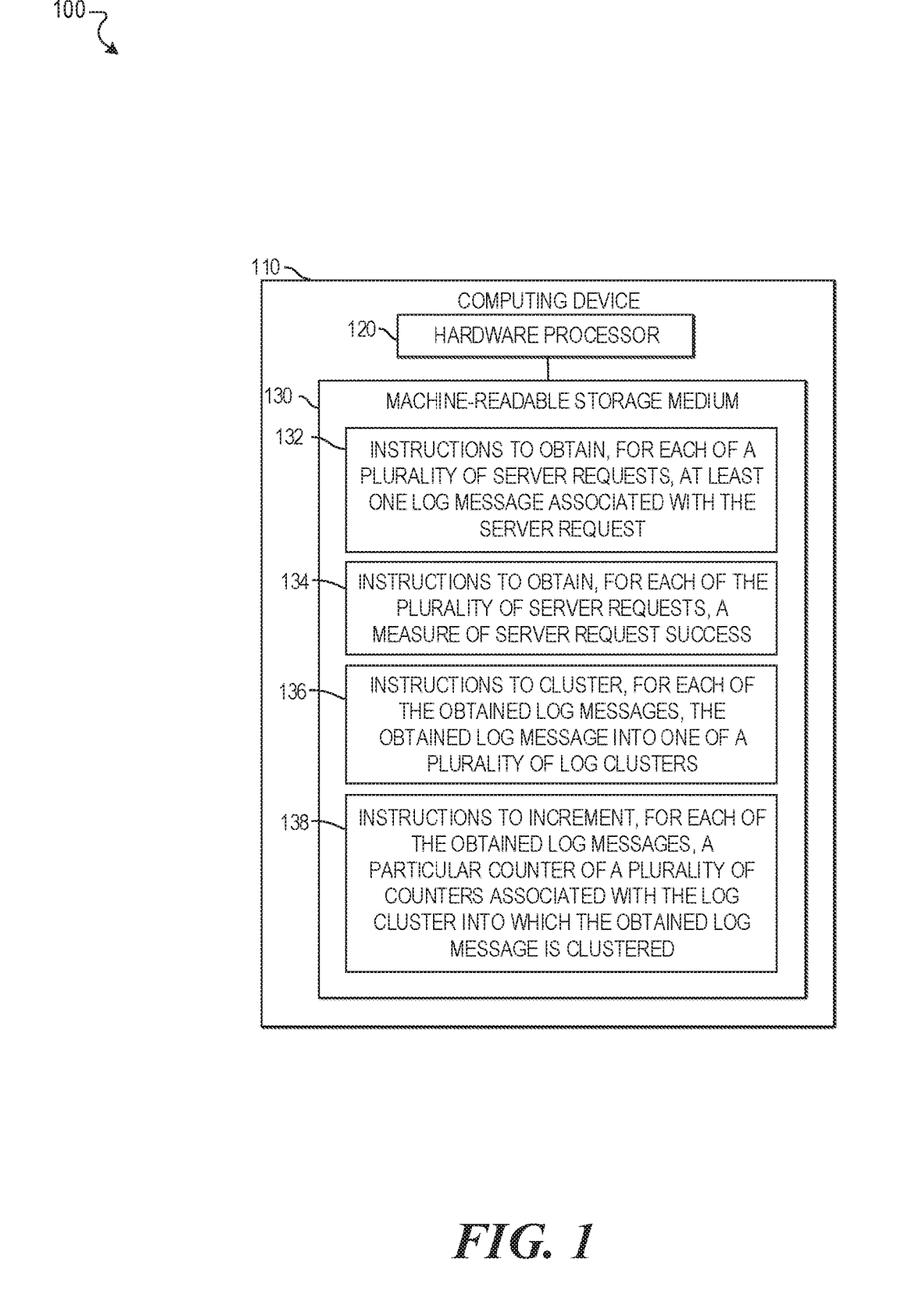
FIG. 1 is a block diagram of an example computing device for identifying problematic messages.

Referring now to the drawings, FIG. 1 is a block diagram 100 of an example computing device 110 for identifying problematic messages. Computing device 110 may be, for example, a personal computer, a server computer, cluster of computers, or any other similar electronic device capable of processing data. In the example implementation of FIG. 1, the computing device 110 includes a hardware processor, 120, and machine-readable storage medium, 130.

Hardware processor 120 may be one or more central processing units (CPUs), semiconductor-based microprocessors, and/or other hardware devices suitable for retrieval and execution of instructions stored in machine-readable storage medium, 130. Hardware processor 120 may fetch, decode, and execute instructions, such as 132-138, to control processes for identifying problematic messages. As an alternative or in addition to retrieving and executing instructions, hardware processor 120 may include one or more electronic circuits that include electronic components for performing the functionality of one or more instructions, e.g., a Field Programmable Gate Array (FPGA) or Application Specific Integrated Circuit (ASIC).

A machine-readable storage medium, such as 130, may be any electronic, magnetic, optical, or other physical storage device that contains or stores executable instructions. Thus, machine-readable storage medium 130 may be, for example, Random Access Memory (RAM), non-volatile RAM (NVRAM), an Electrically Erasable Programmable Read-Only Memory (EEPROM), a storage device, an optical disc, and the like. In some implementations, storage medium 130 may be a non-transitory storage medium, where the term "non-transitory" does not encompass transitory propagating signals. As described in detail below, machine-readable storage medium 130 may be encoded with executable instructions: 132-138, for identifying problematic messages.

As shown in FIG. 1, the hardware processor 120 executes instructions 132 to obtain, for each of a plurality of server requests, at least one log messages associated with the server request. For example, a server computer may log server requests and messages that are associated with the server request. These server requests and their associated messages may be obtained by the computing device 110. In some situations, multiple server devices may handle a single server request. In this situation, messages from each server device that handled the server request may be obtained with the server request.

The hardware processor 120 executes instructions 134 to obtain, for each of the plurality of server requests, a measure of server request success. The measure of server request success may vary and may depend upon how a successful server request is determined. In some implementations, HTTP response codes may be used may be used as a measure of success. E.g., 200 response codes may be measures that indicate the server request was successful, anything else is a measure that indicates the server request failed. Response time, or latency, may also be used as a measure of server request success, e.g., server request success may be determined by comparing response time to a predetermined response time threshold. In some implementations, multiple measures of server request success may be obtained, and the measures may be used in combination to determine whether a server request was successful or not. For example, any HTTP response codes in the 4XX or 5XX range may be measures that indicate a failed server request, regardless of the response time, and HTTP response codes of 200 may still be associated with a failed server request in a situation where the response time exceeds a predetermined threshold.

The hardware processor 120 executes instructions 136 to cluster, for each of the obtained log messages, the obtained log message into one of a plurality of log clusters. The clustering is based on a measure of similarity between the obtained log message and other log messages included in the log cluster into which the obtained log message is clustered. Clustering may be performed in a variety of ways using a variety of clustering algorithms. In some situations, the clustering process may create a dictionary of text patterns and/or regular expressions based on commonalities in log messages. For example, many log messages contain similar text with changes to certain details, such as an IP address or port number included in the message. Those messages may be clustered together based on a portion of matching text of the messages.

The hardware processor 120 executes instructions 138 to increment, for each of the obtained log messages, a particular counter of a plurality of counters associated with the log cluster into which the obtained log message is clustered. In some implementations, each cluster is associated with a problematic counter that indicates a number of log messages of that cluster that are associated with a potentially problematic server request, and a benign counter that indicates a number of log messages of that cluster that are not associated with a problematic server request. In this situation, either the problematic counter or the benign counter may be incremented, e.g., based on the measure of server request success associated with the server request that the log message is associated with. For example, a particular log message that is associated with a problematic server request may be clustered with similar messages in a particular cluster. The problematic counter of that particular cluster may be incremented by one as a result of the particular log message being clustered in that particular cluster. Other types of counters may also be used, e.g., for tracking separate types of problems. For example, a cluster may have counters for specific types of problems, such as a time-out counter for log messages associated with server requests that timed-out and/or a counter for log messages associated with 4XX HTTP response code responses from a server device.

Over time, clusters and counters are updated as a result of the log messages that are identified as belonging to each cluster and the measures of server request success for the server requests associated with those log messages. In some implementations, certain clusters may be identified as problematic while others may be identified as benign. For example, a cluster may be associated with a problem if at least 50% of the log messages included in that cluster are associated with problematic server requests. Clusters may, in some implementations, be associated with a ratio or other measure designed to indicate how likely it is that log messages included in the cluster are associated with a problem. For example, a cluster that includes 100 problematic log messages and 900 benign log messages may be less likely to be considered problematic than a cluster associated with 600 problematic log messages and 200 benign log messages. These clusters and the associated counters may be used to facilitate the process for identifying problematic messages, e.g., those within problematic clusters and newly received log messages as they are clustered.

In some implementations, the hardware processor 120 may execute instructions to receive a plurality of log messages that are associated with a new server request. For each of those log messages, one of the log clusters may be identified, e.g., based on similarity between the log message and the cluster. One or more of the log messages may be identified as a target log message based on the log cluster to which the target log message belongs. A target log message may be a potentially problematic log message. For example, in a situation where the target log message was added to the cluster above with 600 problematic log messages and 200 benign log messages, the target message may be identified as potentially problematic or likely to be indicative of a problem.

In the situation above, the hardware processor 120 may execute instructions for performing a variety of actions upon identifying the target message as potentially problematic. In some implementations, the hardware processor 120 may execute instructions to generate a notification associated with the target log message that indicates the target log message is potentially problematic. The notification may be sent, for example, to an anomalous event handler and/or the administrator of the software or server device from which the server request log message was received. In some implementations, the hardware processor 120 may execute instructions to increment a counter associated with the cluster to which the target log message belongs, e.g., based on a measure of server request success associated with the corresponding server request.

Figure 2:
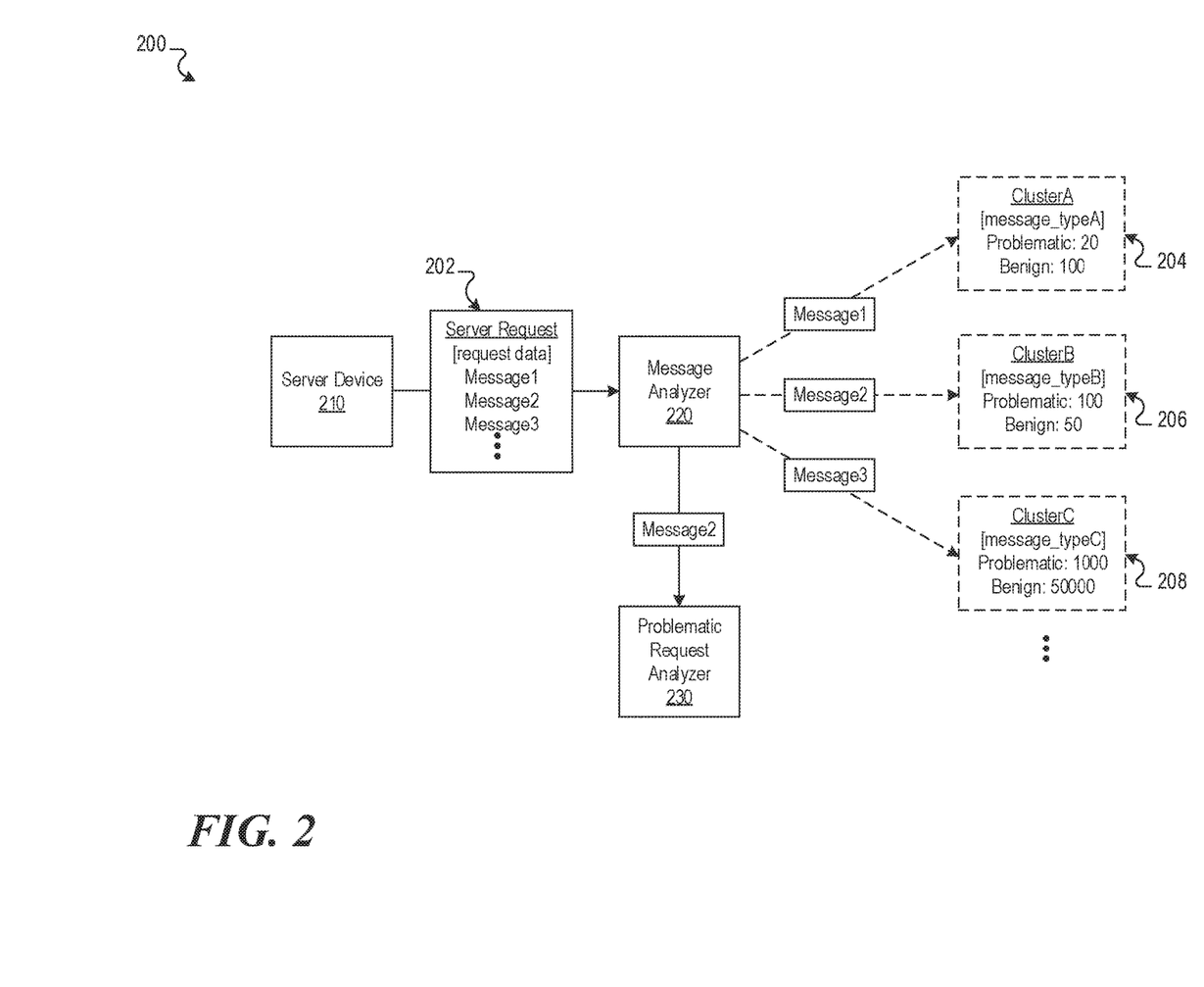
FIG. 2 is an example data flow depicting the identification of problematic messages.

FIG. 2 is an example data flow 200 depicting the identification of problematic messages. The data flow 200 includes a message analyzer 220 that may perform a variety of functions. The message analyzer 220 may be the same as or similar to the computing device 110 of FIG. 1. The data flow 200 also includes a server device 210 and a problematic request analyzer 230, which are described in further detail below. Other implementations may include additional devices, such as other user/input devices and/or output devices for providing notifications.

During operation, the server device 210 provides the message analyzer 220 with data for a server request 202. In the example implementation, the server request data 202 includes information about the request, such as latency and/or an HTTP response code associated with the request, and messages, e.g., message1, message2, and message3, and so on. The information included with the server request 202 data may be used as a measure of server request success, e.g., the latency and/or HTTP response code.

The message analyzer 220 may determine, based on the measure of server request success included in the server request 202 data, whether the server request was successful. For example, the message analyzer may compare the latency value of the server request 202 to a predetermined threshold to determine that the server request 202 was unsuccessful.

Whether the server request was successful or not, the message analyzer 220 may identify, for each of the log messages included in the server request data 202, a cluster to which the log message belongs. As described above, the identification of a cluster for a log message may be based on similarity between the log message and the messages included in a cluster. In implementations where regular expressions are used to represent clusters, a log message may be identified as belonging to a particular cluster in response to the log message matching a regular expression associated with the cluster. In the example data flow 200, message1 is identified as belonging to ClusterA 204, message2 is identified as belonging to ClusterB 206, and message3 is identified as belonging to ClusterC 208.

In the example data flow, each of the clusters, 204, 206, and 208, are associated with a message type that defines the types of messages included in the cluster, e.g., a regular expression or other clustering data used to determine whether a message should be included in the cluster. Each of the example clusters is also associated with two counters: a problematic counter that indicates how many of the messages that were previously identified as belonging to that cluster were associated with a problematic server request, and a benign counter that indicates how many of the messages that were previously identified as belonging to that cluster were not associated with a problematic server request.

In situations where the server request data 202 indicates that the corresponding server request was successful, the benign counter for a cluster may be incremented for each log message that was included in the server request data 202 and identified as belonging to the cluster. In situations where the server request data 202 indicates that the corresponding server request was unsuccessful, the problematic counter for a cluster may be incremented for each log message that was included in the server request data 202 and identified as belonging to the cluster. Given the example problematic server request described above, the problematic counter for each of the clusters, e.g., ClusterA 204, ClusterB 206, and ClusterC 208, may be incremented.

The message analyzer 220 may use the clusters to identify one of the messages included in the server request data 202 as problematic, or potentially problematic. In some implementations, clusters may be identified as problematic, e.g., based on the problematic and benign counters. For example, a threshold ratio of problematic to benign counter values may be used to identify clusters as problematic or benign. Problematic may not be a binary determination, and may instead be based on a scale. For example, the counter values may be used to identify, for a particular cluster, a measure of likelihood that a message being included in the cluster is indicative of a problem with the server request associated with the message.

By way of example, log messages included in ClusterB 206 are associated with 100 instances of a problematic server request and 50 instances of a benign server request, a ratio of 2:1. Stated differently, a log message that is included in ClusterB 206 has a ~66% chance of being associated with a problematic server request. These values may be greater than a predetermined threshold for associating a cluster with a problem, or identifying the cluster as indicative of a problem. Message2, which was identified by the message analyzer 220 as belonging to ClusterB, may be identified as a problematic log message, or potentially problematic log message, based on its inclusion in ClusterB 206.

In the example data flow 200, the message analyzer 220 provides potentially problematic messages, Message2 in this situation, to a problematic request analyzer 230. In some implementations, additional information, such as a measure of likelihood that the Message2 is indicative of a problem, may also be provided with the messages sent to the problematic request analyzer 230. The problematic request analyzer 230 may perform a variety of actions, including providing notifications and/or initiating remedial measures, in response to receipt of the problematic log message(s).

While the example data flow 200 depicts an example implementation depicting the identification of problematic messages, the manner in which problematic message identification is implemented may vary. For example, messages may be received from a device other than a server device, e.g., from a separate device that produces logs associated with other types of requests or actions. As another example, the above operations described as being performed by the problematic request analyzer 230 may be performed by the message analyzer 220. The message analyzer 220 may include multiple computing devices for performing different functions of a system for identifying problematic messages, e.g., one device for clustering messages and updating counters and a separate device for identification of problematic messages for individual server requests.

Figure 3:
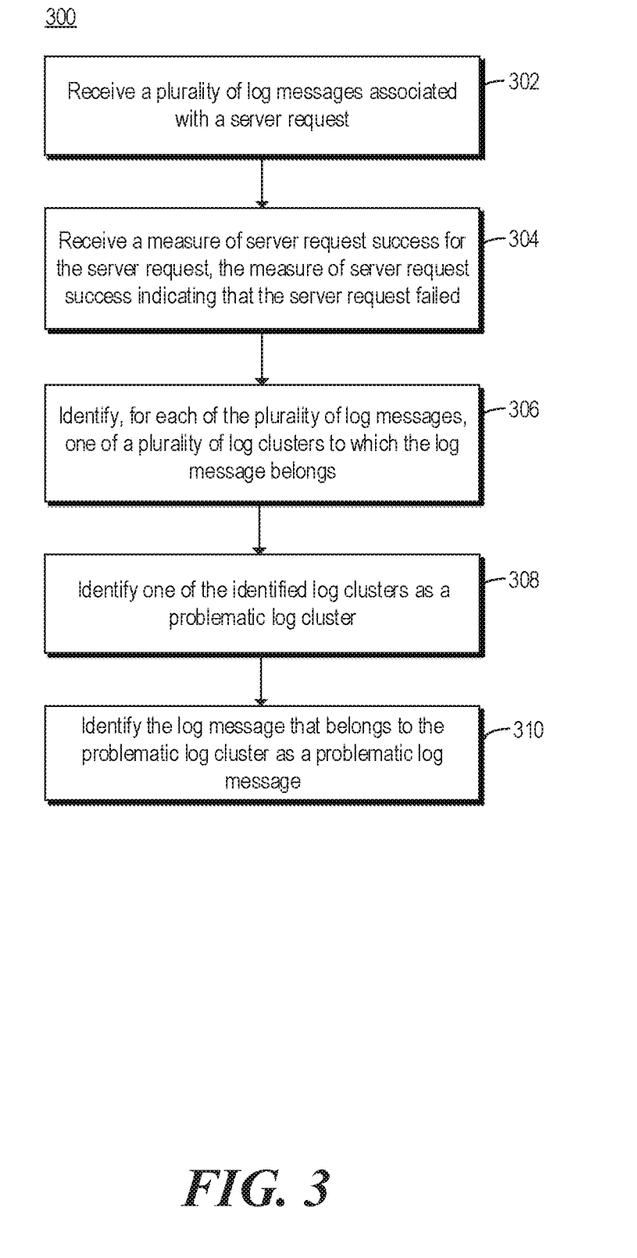
FIG. 3 is a flowchart of an example method for identifying problematic messages.

FIG. 3 is a flowchart of an example method 300 for identifying problematic messages. The method 300 may be performed by a computing device, such as a computing device described in FIG. 1. Other computing devices may also be used to execute method 300. Method 300 may be implemented in the form of executable instructions stored on a machine-readable storage medium, such as the storage medium 130, and/or in the form of electronic circuitry.

A plurality of log messages associated with a server request are received (302). For example, a server device that handles server requests from client devices may produce log messages associated with each server request. Log messages may include a variety of information for a variety of software, services, and functions.

A measure of server request success is received for the server request, the measure of server request success indicating that the server request failed (304). For example, the measure of server request success may be a measure of latency, e.g., the response time that indicates a period of time between the server request and a response from the server device to which the request was provided. In some implementations, a determination that the server request failed may be made based on a comparison of the measure of latency to a predetermined threshold, e.g., latency greater than 2 seconds may be indicative of a failure. In some implementations, other measures of server request may be used, such as HTTP response codes, alone or in combination with latency.

For each of the plurality of log messages, one of a plurality of log clusters to which the log message belongs is identified (306). The clustering may be performed using a variety of clustering algorithms or other organizational methods, such as string matching and regular expressions. In implementations where benign and problematic counters are used for clusters, the benign or problematic counter may be incremented for the identified log cluster. In the situation where the server request associated with the log message failed, the problematic counter for the identified log cluster may be incremented.

One of the identified log clusters is identified as a problematic log cluster (308). A log cluster may be identified as problematic, for example, based on the log messages that were previously identified as belonging to that cluster. In some implementations, benign and problematic counters may be used to track, for a cluster, the number of log messages added to the cluster that were associated with a problematic server request. In this situation, the benign and problematic counters may be used to identify a particular cluster as a problematic log cluster.

The log message that belongs to the problematic log cluster is identified as a problematic log message (310). In some implementations, data indicating the problematic log message and the server request may be provided to a problematic request analyzer for further analysis, remediation, and/or notification. Identification of the log message as a problematic log message does not necessarily mean that the log message is definitely indicative of a problem, but it may indicate that a log message merits additional investigation relative to the investigation effort put into log messages that are not identified as problematic.

Figure 4:
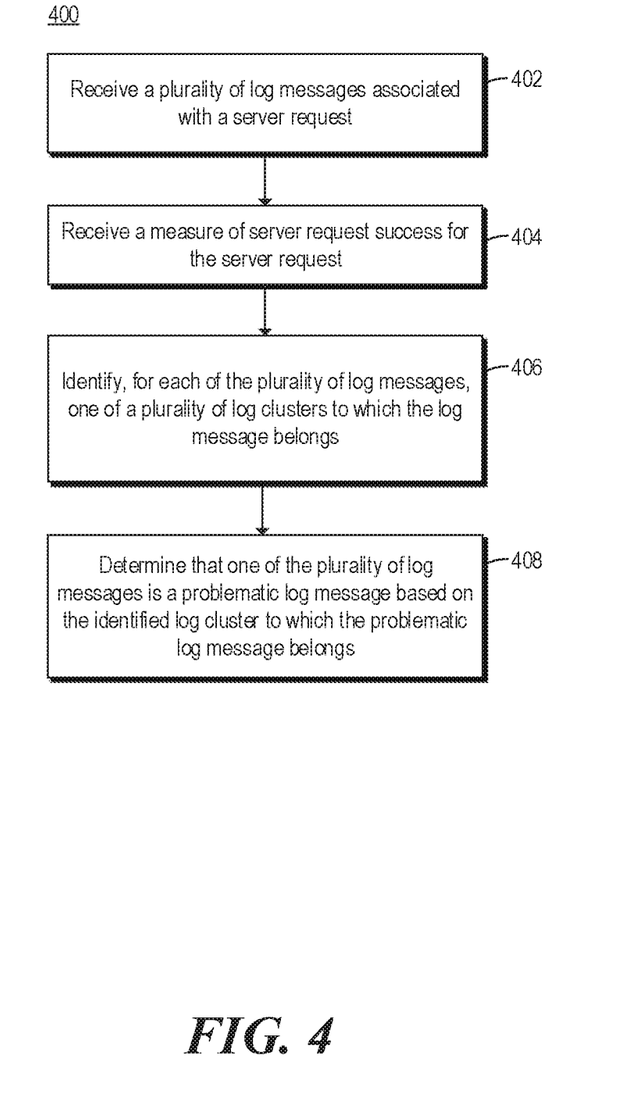
FIG. 4 is a flowchart of an example method for the identification of problematic messages.

FIG. 4 is a flowchart of an example method 400 for the identification of problematic messages. The method 400 may be performed by a computing device, such as a computing device described in FIG. 1. Other computing devices may also be used to execute method 400. Method 400 may be implemented in the form of executable instructions stored on a machine-readable storage medium, such as the storage medium 130, and/or in the form of electronic circuitry.

A plurality of log messages associated with a server request are received (402). For example, a server device that handles server requests from an application may produce log messages associated with each server request.

A measure of server request success for the server request is received (404). For example, a measure of latency or an HTTP response code may be received for the server request.

For each of the plurality of log messages, one of a plurality of log clusters to which the log message belongs is identified (406). As noted above, the clustering may be performed using a variety of clustering algorithms or other organizational methods.

One of the plurality of log messages is determined to be a problematic log message based on the identified log cluster to which the problematic log message belongs (408). For example, benign and problematic counters may be used to track, for a cluster, the number of log messages added to the cluster that were associated with a problematic server request. In this situation, the benign and problematic counters may be used to identify a particular log message as problematic based on the counters of the cluster to which it belongs.

In situations where the measure of server request success indicates that the server request was successful, the benign counter may be incremented for each cluster identified for each of the log messages associated with the server request. In situations where the measure of server request success indicates that the server request was not successful, the problematic counter may be incremented for each cluster identified for each of the log messages associated with the server request. In this situation, counters for the clusters are updated over time based on the log messages that are identified as belonging to those clusters and the measures of server request success associated with the server requests that correspond to those log messages.

While the methods 300 and 400 are described with respect to a single computing device, various portions of the methods may be performed by other computing devices. For example, one computing device may be responsible for performing clustering and updating cluster counters, while another computing device is responsible for identifying particular messages as problematic.

The foregoing disclosure describes a number of example implementations for identifying problematic messages. As detailed above, examples provide a mechanism for using message clustering and counters associated with those clusters to determine whether a particular message may be indicative of a problem.

We claim:

1. A non-transitory machine-readable storage medium encoded with instructions executable by a hardware processor of a computing device for identifying problematic messages, the machine-readable storage medium comprising instructions to cause the hardware processor to:
   obtain log messages associated with a server request;
   obtain a latency measure of the server request;
   cluster each of the obtained log messages into one of a plurality of log clusters based on a measure of similarity between the obtained log message and other log messages included in the log cluster, wherein each of the log clusters includes a problematic counter indicating a total number of problematic messages in the log cluster and a benign counter indicating a total number of non-problematic messages in the log cluster;
   compare the latency measure of the server request to a threshold;
   increment the problematic counter in each of the log clusters if the latency measure exceeds the threshold or increment the benign counter in each of the log clusters if the latency measure does not exceed the threshold;
   determine that one of the obtained log messages is a problematic log message based on a ratio of the problematic counter over the benign counter in the log cluster to which the problematic log message belongs; and
   display the problematic log message as a notification of a potential problem.

2. The storage medium of claim 1, wherein the instructions further cause the hardware processor to:
   receive a plurality of log messages that are associated with a new server request;
   identify, for each of the plurality of log messages, one of the plurality of log clusters to which the log message belongs; and
   identify one of the plurality of log messages as a target log message based on the log cluster to which the target log message belongs.

3. The storage medium of claim 2, wherein the instructions further cause the hardware processor to:

generate a notification associated with the target log message, the notification indicating that the target log message is potentially problematic.

4. The storage medium of claim 2, wherein the identification of one of the plurality of log messages as a target message based on the log cluster to which the target log message belongs is based on a ratio of the problematic counter over the benign counter in the log cluster to which the target log message belongs.

5. The storage medium of claim 1, wherein the problematic counter indicates a number of log messages that are associated with a potentially problematic server request; and the benign counter indicates a number of log messages that are not associated with a problematic server request.

6. The storage medium of claim 1, wherein the instructions further cause the hardware processor to:
identify each of the plurality of log clusters as one of potentially problematic or benign, the identification being based on the ratio of the problematic counter over the benign counter for each of the plurality of log clusters.

7. A computing device comprising:
a hardware processor; and
a data storage device storing instructions that, when executed by the hardware processor, cause the hardware processor to:
receive a plurality of log messages associated with a server request;
receive a latency measure of server request;
identify, for each of the plurality of log messages, one of a plurality of log clusters to which the log message belongs, wherein each of the log clusters includes a problematic counter indicating a total number of problematic messages in the log cluster and a benign counter indicating a total number of non-problematic messages in the log cluster;
compare the latency measure of the server request to a threshold;
increment the problematic counter in each of the log clusters if the latency measure exceeds the threshold or increment the benign counter in each of the log clusters if the latency measure does not exceed the threshold;
identify one of the identified log clusters as a problematic log cluster based on a ratio of the problematic counter over the benign counter in the problematic log cluster; and
display the log message that belongs to the problematic log cluster as a problematic log message.

8. The computing device of claim 7, wherein the latency measure of server request indicates a period of time between the server request and a response from a server to which the server request was provided.

9. The computing device of claim 7, wherein each of the plurality of log messages are identified as belonging to one of the plurality of log clusters based on similarities between the plurality of log messages and the log clusters to which they belong.

10. The computing device of claim 7, wherein the problematic log cluster is identified based on a ratio of the problematic counter over the benign counter in the problematic log cluster.

11. The computing device of claim 7, wherein the problematic counter indicates a number of log messages that are associated with a potentially problematic server request; and the benign counter indicates a number of log messages that are not associated with a problematic server request.

12. The computing device of claim 7, wherein the instructions further cause the hardware processor to:
increment the problematic counter associated with the problematic log cluster.

13. The computing device of claim 7, wherein the instructions further cause the hardware processor to:
identify a second of the identified log clusters as a benign log cluster based on a ratio of the problematic counter over the benign counter in the benign log cluster;
identify the log message that belongs to the benign log cluster as a benign log message; and
increment a benign counter in the benign log cluster.

14. The computing device of claim 7, wherein the instructions further cause the hardware processor to:
provide data indicating the problematic log message and the server request to a problematic request analyzer.

15. A method, implemented by a hardware processor, the method comprising:
receiving a plurality of log messages associated with a server request;
receiving a latency measure of the server request;
identifying, for each of the plurality of log messages, one of a plurality of log clusters to which the log message belongs, wherein each of the log clusters includes a problematic counter indicating a total number of problematic messages in the log cluster and a benign counter indicating a total number of non-problematic messages in the log cluster;
comparing the latency measure of the server request to a threshold;
incrementing the problematic counter in each of the log clusters if the latency measure exceeds the threshold or incrementing the benign counter in each of the log clusters if the latency measure does not exceed the threshold;
determining that one of the plurality of log messages is a problematic log message based on a ratio of the problematic counter over the benign counter in the log cluster to which the problematic log message belongs; and
displaying the problematic log message as a notification of a potential problem.

16. The method of claim 15, wherein each of the plurality of log messages are identified as belonging to one of the plurality of log clusters based on similarities between the plurality of log messages and the log clusters to which they belong.

17. The method of claim 15, wherein the problematic counter indicates a number of log messages in the log cluster that are associated with a potentially problematic server request; and the benign counter indicates a number of log messages in the log cluster that are not associated with a problematic server request.

18. The method of claim 15, wherein determining one of the plurality of log messages to be the problematic log message when the ratio of the problematic counter over the benign counter is greater than a predetermined number.

19. The method of claim 15, wherein incrementing the problematic counter in each of the log clusters includes incrementing the problematic counter for each of the log messages associated with the server request that are identified as belonging to the log cluster.

20. The method of claim 15, wherein the latency measure of server request indicates a period of time between the server request and a response from a server to which the server request was provided.

* * * * *